United States Patent [19]
Schraft et al.

[11] 3,789,516
[45] Feb. 5, 1974

[54] CONTINUOUS TUNNEL OVEN FOR BAKING AND/OR DRYING

[75] Inventors: Horst Schraft, Stuttgart; Horst Mack, Boblingen, both of Germany

[73] Assignee: Firma Werner & Pfeiderer, Stuttgart, Germany

[22] Filed: Sept. 19, 1972

[21] Appl. No.: 290,373

[30] Foreign Application Priority Data
Oct. 8, 1971 Germany............................ 21501928

[52] U.S. Cl...................... 34/216, 34/217, 34/225, 34/233, 432/137
[51] Int. Cl............................................. F26b 19/00
[58] Field of Search..................... 34/105, 208–216, 34/217, 223, 224, 225, 232, 233, 236; 432/133, 137

[56] References Cited
UNITED STATES PATENTS

| 3,173,384 | 3/1965 | Dersch et al.......................... 34/225 |
| 1,888,573 | 11/1932 | Sandwith .............................. 34/225 |
| 1,593,378 | 7/1926 | Younger................................ 34/216 |
| 2,668,366 | 2/1954 | Barnett.................................. 34/225 |
| 2,110,352 | 3/1938 | Baker.................................... 34/208 |

Primary Examiner—Kenneth W. Sprague
Assistant Examiner—James C. Yeung
Attorney, Agent, or Firm—Browdy & Neimark

[57] ABSTRACT

A continuous tunnel oven for baking and/or drying utilizes a baking belt passing through a baking chamber with a nozzle heater arranged in individual zones with the free valve opening area of the nozzles being adjustable.

2 Claims, 2 Drawing Figures

Patented Feb. 5, 1974 3,789,516
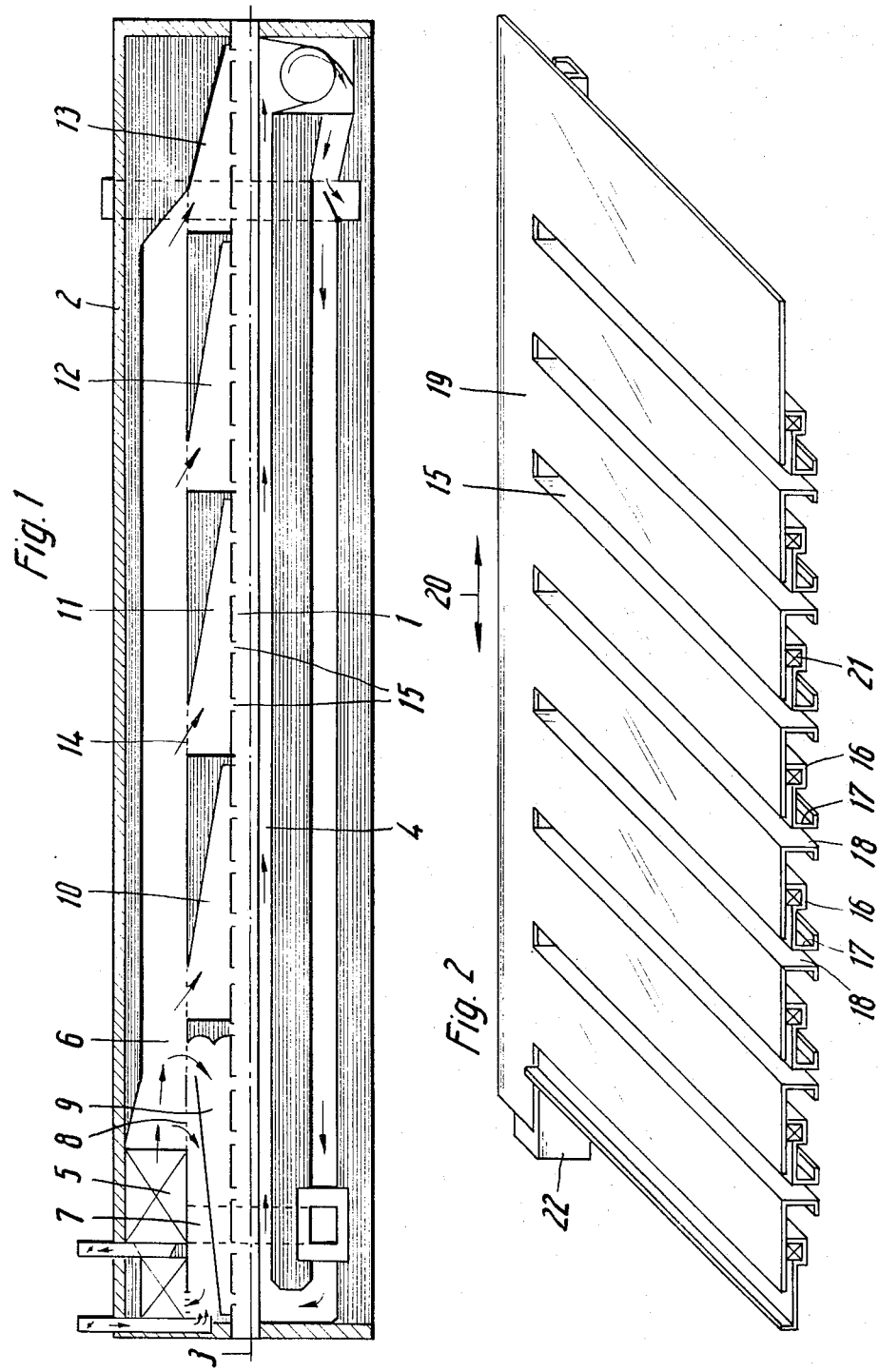

CONTINUOUS TUNNEL OVEN FOR BAKING AND/OR DRYING

This invention relates to a continuous tunnel oven for baking and/or drying with a baking belt passing through a baking chamber and with a nozzle heater acting upon the baked material on the baking belt by means of a heating gas, the nozzles being arranged in nozzle groups for individual baking or drying zones.

Similar tunnel ovens are often used (depending on their size and weight) for various types of baked products, for example, so-called "small baked products." The critical flow rate of the heating gases result in changes in the baked products, in their weight or flow-resistance. The critical flow rate is understood to be the velocity of the heating gas when it strikes the baked products, the latter still remaining at rest on the baking belt. It is at this critical flow rate that the maximum possible heat transfer to the baked products and the maximum possible drying effect of the baked products take place. This is due to the fact that heat transfer increases with increasing velocity of the heating gas. With respect to drying, increasing flow velocities have the result that the vapor pressure in the boundary layer on the baked products is reduced, so that a water vapor pressure is established there which is below the partial pressure corresponding to that particular temperature. Hence, the latter condition and the improved heat transfer accelerate the drying.

In the known types of ovens, adjustment to various critical flow velocities is mainly possible only by changing the flow volume. This has the result, however, that in many instances, the baked products no longer receive the necessary amount of heat for unit time.

Hence, the object of the present invention is to construct a continuous tunnel oven of the type initially described, in such a way that the flow velocity can be changed without modifying the flow volume of the heating gas.

This object is accomplished according to the present invention by making the free valve opening area of the nozzles (combined to form nozzle groups) adjustable. By enlarging the nozzle cross sections, the flow velocity is reduced without reducing the volume flow of the heating gas, so that the same amount of heat reaches the baked products with equal heat requirements and heat carrier volumes. Advantageously, an adjustable nozzle carrier is provided for the nozzles of a nozzle group which are arranged in a single plane, the carrier supporting one side wall of the nozzles made in the form of slit nozzles is a further advantageous feature of the invention, while the other side-wall is fixed in place in the oven. This simple configuration also makes it possible to close the nozzles nearly completely and thereby form a radiator which acts on the baked products exclusively or primarily with radiated heat. This simple configuration of the continuous tunnel oven likewise allows a combination of heating by radiation and convection to be created, which is recommended especially in the case of very sensitive baked products.

Further advantages and features of the present invention will become more apparent from the following detailed description of an embodiment later in conjunction with the drawings wherein:

FIG. 1 shows a lengthwide section view of a continuous tunnel oven in a schematic representation, and FIG. 2 shows a schematic top view of a nozzle group with variable nozzle cross sections.

In baking chamber 1 of a continuous tunnel oven 2, there is a baking belt 3, consisting of a thin steel band or a fine-mesh lattice-work belt, on which the baked products are carried through the baking chamber. The baking belt 3 is exposed to heat from below by means of a radiant heater 4, and from above, by means of heating gas.

The heating gas (as a rule, air) is heated in a heater unit 5, consisting of a burner and heat exchanger, and flows from there into a heating gas duct 6. At the inlet of the heating gas duct is a bypass 7, with a throttle disk 8, mounted upstream. In the embodiment shown, five nozzle boxes 9 to 13 extend for the entire length of the oven, the nozzle boxes being connected to the heating gas duct 6 by throttle disks 14. On the side facing the baking chamber, the nozzle boxes have slit nozzles 15, that are parallel to one another and extend over nearly the entire width of the baking chamber 1. As can be seen clearly from FIG. 2, these slit nozzles have variable cross sections. As illustrated, one side wall 17 is attached to each slit nozzle 15 at profiles 16 locally in the oven. The other side wall 18 of each slit nozzle 15 is attached to a nozzle carrier 19 mounted horizontally and adjustably along the length of the oven. so that a shifting of the nozzle carrier according to the double arrow 20, in FIG. 2, either reduces the nozzle cross section or increases it. In each profile 16, as seal 21 is provided which extends over the width of the baking chamber, serving to prevent leakage of the heating gas between the profile 16 and the nozzle carrier 19.

The locally arranged profiles are attached to a frame 22. The adjustment of the nozzle carrier 19 can be achieved by a known type of drive.

If a closable exhaust aperture is provided in the nozzle box, the latter can be used as pure or at least predominately radiant heating when the slit nozzles 15 are completely closed. Each nozzle box 9 to 13 is provided with a separately drivable nozzle carrier 19 so that the control of the flow velocity in each baking or drying zone which corresponds to a nozzle box can be achieved.

It will be obvious to those skilled in the art that various changes may be made without departing from the scope of the invention and the invention is not to be considered limited to what is shown in the drawings and described in the specification.

What is claimed is:

1. A continuous tunnel oven having a baking chamber for baking and/or drying baked goods, comprising:

a housing having a longitudinal opening therethrough comprising the baking chamber;
   a baking belt passing through said baking chamber;

a heating gas duct connected to said housing;
   a plurality of nozzle boxes mounted above said belt and connected in parallel to said heating gas duct;

heating gas supply means connected to said housing for forcing heating gas through said heating duct;

throttle means connected between said heating gas duct and each of said nozzle boxes for adjusting the amount of heating gas passing from said duct into each of said nozzle boxes;

a nozzle group comprising a plurality of nozzles connected within each of said nozzle boxes, each of said nozzles being slit nozzles extending over substantially the entire width of said baking chamber, and having vertical side walls for directing the heating gas vertically onto the baking belt; and adjusting means connected to each of said nozzle groups for adjusting the free valve opening areas of each of the nozzles within said group, each of said adjusting means being independent of the others, said adjusting means being capable of completely closing said nozzles; whereby individual drying zones may be produced within the baking chamber beneath each of said nozzle boxes.

2. An oven in accordance with claim 1 wherein said groups of nozzles further includes an adjustable nozzle carrier which carries one side wall of each of the nozzles in said group and wherein the other wall of each of said nozzles is fixedly connected to said housing whereby adjustment of said nozzle carrier causes movement of said walls towards and away from one another and thus opening and closing said slit nozzles.

* * * * *